UNITED STATES PATENT OFFICE.

ERWIN F. VON WILMOWSKY, OF BOSTON, MASSACHUSETTS.

PROCESS OF REFINING CHARACTERISTIC GUMS OF GUTTA-PERCHA.

SPECIFICATION forming part of Letters Patent No. 673,570, dated May 7, 1901.

Application filed November 4, 1896. Serial No. 611,024. (No specimens.)

*To all whom it may concern:*

Be it known that I, ERWIN F. VON WILMOWSKY, a citizen of the United States of America, and a resident of the city of Boston, county of Suffolk, Commonwealth of Massachusetts, have invented a new and useful Process of Refining the Characteristic Gums of Gutta-Percha and Similar Matters, of which the following is a specification.

The cleansed gutta-percha as generally employed in the arts still contains certain finely-divided dirt-like impurities, such as ulmine-like coloring-matter and some water. The removal of those impurities by the processes heretofore known has yielded what is called in the arts "pure gutta-percha." This latter is a mixture of some peculiar hydrocarbon gum or gums, which give the commercial products most of their characteristic properties of value in the arts, and of resinous constituents, together with a small amount of other similar and of volatile substances. It has been known only as an article which soon decays—*i. e.*, turns resin-like and brittle—whereas the cleansed prime gutta-percha is comparatively durable when in a compact condition and protected from the combined action of air and light.

Now the object of my invention is, primarily, to produce substances which while substantially showing the valuable technical properties of the cleansed gutta-percha are harder and especially tougher and more elastic than that article as heretofore used in the arts. I have found that that can be accomplished by the removal, and to some degree even by the partial removal, of the said resin and other similar substances from the characteristic gum or gums of gutta-percha. In doing so I found that such removal generally results in a reduction of the durability of the remaining gum and that such reduction is due to the presence of volatile matter. I have found that the removal of the volatile substances increases the durability of the remaining gum even beyond that of cleansed gutta-percha as heretofore used.

The object of my invention is, secondarily, by a process available in the arts to obtain the characteristic gums of gutta-percha and similar matters technically pure in a durable condition. I have accomplished that by removing from the said characteristic gums such admixtures as the resin and all volatile matter natural to gutta-percha or incidentally added and combining therewith the removal of the dirt-like admixtures, such as bark-powder and coloring-matter or similar incidental admixtures, as well as the removal of water and similar slowly-volatilizing matter, where either of the said substances or admixtures are present, and finally compacting the gums.

I have found that either object requires the use of a suitable agent which does not affect the gum, especially not to impair its durability. The agents which I have found to answer best the purpose are petroleum products, preferably petroleum naphtha of 72° to 76° Baumé, which is free of "oils," so called— *i. e.*, free of any oils of higher boiling-point; but other suitable agents may be employed, as will hereinafter be explained. As a preliminary step I prefer, in the usual way, to comminute and by washing and macerating cleanse the raw material, if the same is solid, in hot water. The mass may then be dried for a few days at a temperature of about 100° Fahrenheit.

The first step of my process consists in differentiating from each other the aggregate state of the gum and the aggregate state of the above-mentioned resinous and other similar or volatile ingredients, and thereby virtually separating the one from the other in such a manner that the durability of the gum is not impaired. I combine therewith, if the gum is to be rendered pure, the removal of the remaining generally dirt-like admixtures and of the water where either is present. I do this preferably as follows: The raw material in pieces of suitable size is put into an iron vessel provided with a cover and a stirring mechanism and heated by a steam-jacket. In this vessel petroleum naphtha is kept at a temperature of about 120° to 140° Fahrenheit. I take, *e. g.*, one pound of red gutta-percha to one gallon of naphtha. The vessel is then closed and connected with suitable apparatus for recondensing any escaping naphtha-vapors and returning the naphtha. The mixture is stirred until all soluble parts are dissolved. The solution is then removed from the undissolved parts and the water. This may be done by any suitable means heretofore known—*e. g.*, the solution may be drawn off and strained. I prefer to effect the separation by the difference of specific gravity in a dilute solution. Especially when a superior product is aimed at it is well to use, e. g., about four gallons of naphtha to one pound of crude material and to let the solution stand until settled, so that one part of it is clear, and then to draw the clear part off. During the settling of the solution, which takes some time—say ten to thirty hours—too much cooling down must be prevented and the settling must not be disturbed. If a pure product is not aimed at, the straining or any equivalent operation may be omitted. If a specially elastic product is wanted, the above-mentioned ulmine-like matters should be carefully eliminated. The gum is now converted from its aggregate state of fluidity or solution into a more or less solid aggregate state. This may be accomplished by any suitable means used heretofore for gutta-percha which does not impair the durability of the gum. If the solvent is sufficiently volatile, it may be evaporated. It has heretofore been proposed to recover gutta-percha from its solution by mixing the latter with, e. g., ethylic alcohol, whereby a slimy mixture of the gum and a part of the resin still containing a part of the solvent is produced. I prefer to recover the gum by suitably lowering the temperature of the solution, thus avoiding the introduction of any water as well as the application of any heat—e. g., a petroleum-naphtha solution of crude prime red gutta-percha I let cool to about 60° Fahrenheit or below. I have found that if the solution is thus let cool generally no change occurs for some hours after it has reached the ordinary atmospheric temperature; but after a certain time the solution, if concentrated, has turned into a seemingly solid mass. If the solution is thin—e. g., if four gallons or more of naphtha have been used to one pound of crude prime red gutta-percha—a loose precipitate of individually-formed distinctly separate though usually coherent granules or particles has accumulated in the liquor.

I have found that the precipitated substance, at least after a moderate compression, has a sponge-like character, showing no stickiness or loss of porosity when subjected to moderate pressure, and that it consists of the gum alone, retaining in its pores a solution of the resin and of some volatile and other substances usually found in the crude material, as well as divers foreign admixtures, various resins, and volatile matters, such as remain dissolved in petroleum naphtha at ordinary temperature. A differentiation has thus been produced between the aggregate state of the gum and that of all those admixtures, and the latter are virtually separated thereby from the former. The precipitate is spongy and porous, even where no resin has been present in the solution.

I have found that the time taken for precipitating by the different kinds of gums of the gutta-percha group varies considerably. Thus at ordinary atmospheric temperature prime red gutta-percha gum will generally precipitate from the crude within twelve hours, whereas hard white gutta-percha gum often requires three days or more. The time required is shorter the lower the temperature and the more of the gum is in the solution proportionately. Practically all of the gum of gutta-percha proper precipitates from petroleum naphtha free of resin or other substances at about 60° Fahrenheit, if time is allowed as stated.

If resin has been solidified together with the gum—e. g., by evaporation of the solvent—it is dissolved again before further treatment by soaking the mass, sheeted or comminuted, in cold petroleum naphtha for a suitable time. If the removal of insoluble matter is not wanted, the dissolution of the gum may be altogether omitted. In such case the above-said resinous and similar volatile ingredients are dissolved by soaking the raw material comminuted in cold petroleum naphtha; but the perfect removal of the resin from the solid gum is not feasible by such extraction. Besides, I have found that certain volatile matters particularly affecting the durability of the gum—e. g., some volatile ingredients of crude gutta-percha, rests of sulfuric ether, benzol, or disulfid of carbon—stick more persistently to the gum than the resin. To remove these, the gum should be treated in as finely divided a state as possible.

The second step of my process consists in removing from the gum the differentiated admixtures in such a manner that the refined gum is obtained free of volatile matter. This may be accomplished by any suitable means. I preferably remove the dissolved admixtures by extraction, washing, or exhausting the gum with some suitable substance which does not impair its durability or in any manner affect it, such as pure petroleum naphtha, at a sufficiently low temperature. I accomplish this part of my process as follows: I treat the sponge-like mass in a closed centrifugal and remove thereby a part of the liquor. Then I add to the mass in the centrifugal, which should be run so slow that the mass remains very porous, a sufficient quantity of cold pure petroleum naphtha, and thereby wash the mass thoroughly, thus removing the rest of the admixtures soluble in the naphtha. The centrifugal herein referred to is not specially described, because it is merely a convenient and preferred apparatus for carrying out this part of my process, and the forms of such apparatus known heretofore can readily be adapted to the use herein described by any skilled mechanic without the exercising of his inventive faculty. I have found cold petroleum products, such as naphtha, to be peculiarly suitable for the washing or exhausting of the gums of gutta-percha and similar matters, because no stickiness sets in during the operation, whereas with other substances in general the extracting is interfered with by the gum becoming sticky. Besides, as far as gutta-percha proper is concerned, no appreciable amount of the characteristic gum is removed, together with the dissolved admixtures, by petroleum products at about 60° Fahrenheit or below.

If the product at the end of the treatment is not yet sufficiently pure, I repeat either the whole process or such parts of it as may be advisable.

Whatever the admixtures of the gum may be, as far as I have found they either are insoluble in hot or in warm petroleum naphtha, like the coloring-matter of red gutta-percha and water, or are soluble in petroleum naphtha at the ordinary atmospheric temperature or some suitable lower temperature, like the resinous constituents of gutta-percha. By combining, therefore, the treatment of the gum, e. g., with petroleum naphtha at different suitable temperatures all admixtures of whatever nature, including all traces of water, can be removed from the gum. The order in which the soluble admixtures and the insoluble ones are removed may of course be reversed. The character of the different groups of admixtures—such as water, resin, dirt, &c.—removed successively from the gum may vary with different agents. The gum thus refined may be employed in the arts in form of a hot solution or a cement without removing all of the solvent or washing substance; but for general purposes the substance employed in treating the gum is entirely removed from the latter. Steaming has been proposed for removing volatile matter from gutta-percha. I preferably effect the removal by evaporation at a moderate temperature while the gum is in a spongy state, avoiding the introduction of any water. I have found that petroleum naphtha free of "oils," so called, can to its last traces be readily removed from the refined gum in a spongy condition by exposure to the air or to some inert gas if it is evaporated at a temperature below that at which the gum begins to soften, and by prolonged exposure it can thus be removed from a mixture of the gum and a moderate amount—say five per cent.—of petroleum-soluble resin, their proportion depending on the character of the resin. The previous complete removal of the resin greatly facilitates the removal of the last traces of the treating substance and other volatile matter. If the mass is treated in the centrifugal, a stream at first of cold, then of moderately warm, air or an inert gas may be introduced into the centrifugal. This air or gas is driven by centrifugal force at a suitable speed through the spongy mass and carries off the volatile matter. The gum while spongy or sheeted out very thin should then be exposed to air or an inert gas of about 100° Fahrenheit or to the atmosphere for a few days until the last traces of volatile matter are removed. The refined gum is then compacted and freed from air or gas by any suitable means, such as slowly-increasing heat or compression between smooth heated rollers.

The new substances produced by my process are substantially colorless, inodorous, and tasteless. When in a compact condition, they are of wax-like aspect at the ordinary atmospheric temperature. On warming they turn soft and plastic and on heating form a soft pellucid mass. They are chiefly characterized by their perfect solubility in hot petroleum naphtha and their practical insolubility in and indifference to cold petroleum naphtha; further, by insolubility in water and in ethylic alcohol. From the gum of the "pure gutta-percha" as heretofore known they are distinguished especially by being chemically stable and generally inactive when in a compact condition, showing no tendency to decay. If these products are derived, e. g., from prime gutta-percha, they show a higher degree of hardness, tenacity, and elasticity combined than any mixture of gum and resin which has heretofore been obtained from gutta-percha. If the new substances are produced by my process as I preferably apply it, they are absolutely free of water.

The refined gum in a finely-divided condition is sensitive to light and to chemicals, especially to oxidizing agents. While in such condition it should be kept excluded from light.

Only such agents are suitable for treating the gum by the process here described as are neutral to the gum while the latter is in a finely-divided condition. They should, besides, remain neutral to it in the presence of air. Otherwise the gum may be treated in some inert gas, such as hydrogen. The agents must be inert and stable, must not absorb and transfer oxygen, and must to their last traces be removable from the gum, so that especially no volatile matter remains with the product.

I have found that it is very desirable to treat the gum in such a manner that the refined product is also entirely free of any volatilizing matter, like water, since the latter always tends to make the gum less durable by leaving it more or less porous. In order to obtain an article free of water, it is necessary that the solvent, the precipitating agent, and the substance used as above set forth for washing the gum should not have the property of absorbing water. This is important, since the refined gum in a solid state, like the cleansed gutta-percha of commerce, tends to retain water absorbed, which it loses only after many months of aging. It is, further, of technical value if the above said treating substances are such that their last traces can readily be removed from the gum at a temperature below that at which the gum begins to lose its spongy condition. If the solvent is not sufficiently volatile for such purpose—e. g., when petroleum products like kerosene are used—it is after the solidification of the gum or the removal of the admixtures replaced by some suitable substance for washing which has that property, preferably one which will not soften the gum at the ordinary atmospheric temperature, such as cold petroleum naphtha.

The essential feature of my process is that the various admixtures are removed in successive steps by differentiating from each other their aggregate state and that of the gum in such a manner as to obtain the gum unimpaired, technically pure, if so wanted, and free of volatile matter.

I do not limit myself to the treatment of gutta-percha; but I consider as an equivalent of gutta-percha the article of commerce termed "gutta-percha" and also any other substance amenable to the process here described which contains some gum or gums having from the point of view of that process characteristics substantially like those of the gum or gums of gutta-percha and also any mixture or compound containing such substance.

The hydrocarbon gums of the group called "caoutchouc" or "india-rubber," though in their chemical constitution similar to the hydrocarbon gums of the gutta-percha group, are not equivalents of or similar to the latter from the point of view of the process here described, since they are at common temperature affected by liquid petroleum products, either dissolving or swelling in the same. Even at a temperature very much below the freezing-point caoutchouc forms after having been dissolved in hot petroleum naphtha a very voluminous soft compound of a consistency which prevents, practically, its being washed for the purpose of removing the resins. Gutta-percha, on the contrary, forms under similar conditions distinctly-separated granules, which allow an easy and perfect washing when petroleum naphtha is used as washing liquid. On this behavior discovered by me I have based the present invention.

The fact that a solution of gutta-percha in hot petroleum naphtha can be freed from mechanical impurities by settling or straining and that such solution by cooling can be precipitated has been known for many years; but I have analyzed and studied the precipitate and everything pertaining thereto and made use of this precipitation for the purpose of separating the hydrocarbon gums from the resins.

The whole process may be regarded as being based on the discovery of certain peculiarities of gutta-percha rather than of the solvents, as will be clear from the following: In washing chemical substances no difficulty is experienced in most cases—e. g., in washing granulated sugar within a centrifugal by a diluted or concentrated solution of sugar the washing liquid has comparatively (when compared with gum solutions) a very great fluidity, and the sugar crystal is always sharply separated from the liquor. This is different when a gummy substance is to be washed by an organic solvent. Generally considerable and in most cases unsurmountable difficulties present themselves, as the gum becomes swollen or sticky. I have discovered that gutta-percha not always presents those difficulties, but that by the process described herein the gum of gutta-percha can be induced to act in the same way as if it was a crystalline substance, being perfectly and easily permeated by the washing liquor in case the latter is suitably chosen, as has been explained in detail in this specification. Petroleum has been mentioned specifically in the claims; but I regard as an equivalent for the claims and the process of petroleum or petroleum naphtha any hydrocarbon solvent, such as can be derived from crude petroleum or artificial processes of destructive distillation, which does not transfer oxygen to the gum, as turpentine does, and does practically not dissolve or swell the gum at some suitably-low temperature, such as 40° to 60° Fahrenheit.

By "hydrocarbon solvent" in the above a more or less volatile liquid is understood which contains only the elements of carbon and hydrogen.

What I claim, and desire to secure by Letters Patent, is as follows:

1. The process of refining the class of hydrocarbon gums which forms the characteristic gums of gutta-percha which process consists in, first, differentiating by digesting with liquid petroleum products from each other the aggregate state of the gums and the aggregate state of the resinous constituents present; second, removing in liquid form the resinous constituents from the gums and removing by dry evaporation all volatile matter from the gum.

2. The process of refining the class of hydrocarbon gums which forms the characteristic gums of gutta-percha which process consists in, first dissolving the gum in hot petroleum naphtha, removing from the solution the insoluble admixtures, cooling the solution of gum until the gum has precipitated while the soluble admixtures such as resins natural to gutta-percha remain dissolved; second, exposing the precipitated gum in a subdivided state to the action of cold petroleum naphtha and washing the gum with such naphtha removing thereby the soluble admixtures and finally, after the soluble admixtures have been removed, evaporating the parts of petroleum naphtha which remain adhering to the gum, from the gum, while the latter is yet in a subdivided state at a temperature sufficiently low not to destroy this state by compacting the gum, substantially as described.

In testimony whereof I have signed my name, in presence of two witnesses, this 31st day of October, 1896.

ERWIN F. VON WILMOWSKY.

Witnesses:
RAGAN JOYCE,
WILLIAM W. HUNTER.